United States Patent [19]

McIntosh

[11] 3,977,887

[45] Aug. 31, 1976

[54] HIGH DIELECTRIC CONSTANT CERAMICS WHICH CAN BE SINTERED AT LOW TEMPERATURES

[75] Inventor: Charles M. McIntosh, Beacon, N.Y.

[73] Assignee: International Business Machines Corporation, Armonk, N.Y.

[22] Filed: Mar. 8, 1974

[21] Appl. No.: 449,569

[52] U.S. Cl. .............................. 106/46; 106/73.31
[51] Int. Cl.$^2$ .................... C04B 33/26; C04B 35/00
[58] Field of Search ........................... 106/46, 73.31

[56] References Cited
UNITED STATES PATENTS

| | | | |
|---|---|---|---|
| 3,279,947 | 10/1966 | Kaiser | 106/73.31 X |
| 3,666,505 | 5/1972 | Hoffman et al. | 106/73.31 X |
| 3,679,440 | 7/1972 | Mason | 106/46 X |

Primary Examiner—Winston A. Douglas
Assistant Examiner—William G. Wright
Attorney, Agent, or Firm—Sughrue, Rothwell, Mion, Zinn and Macpeak

[57] ABSTRACT

The present invention relates to high dielectric constant ceramics which can be sintered to maximum density at low temperatures. The ceramic structures consist primarily of a skeleton which constitutes the refractory phase and an interstitial glass which serves simultaneously as a bonding agent and a fluxing agent which enables the ceramic structure to densify in the low temperature range. Among the preferred materials used to form the skeleton are polycrystalline materials which have a high dielectric constant, for example, barium titanate, complex dielectric materials such as lead bismuth niobate and the like. The interstitial glasses required are lead silicate based glasses.

16 Claims, 2 Drawing Figures

FIG. 1
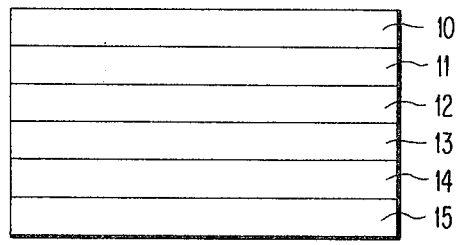
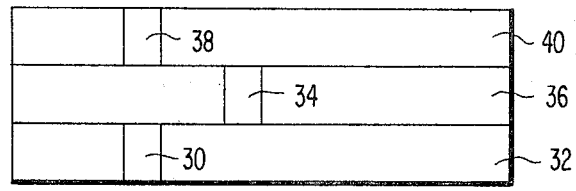
FIG. 2

HIGH DIELECTRIC CONSTANT CERAMICS WHICH CAN BE SINTERED AT LOW TEMPERATURES

BACKGROUND OF THE INVENTION

1. Field of the Invention

The present invention relates to high dielectric constant ceramics which can be sintered at low temperatures and which are particularly adapted for use in electrical components.

2. Description of the Prior Art

Ceramic compositions find substantial applications in the electrical arts in the fabrication of electrical devices. One such application is in forming multilayer ceramic composites, which generally comprise a plurality of layers of a ceramic insulating material and a plurality of layers of a conductive metal material.

To date, substantially all ceramic materials available for use in forming such multilayer ceramic composites either illustrate a low dielectric constant or can be sintered only at high temperatures, e.g., 1250° – 1650°C. or higher.

Accordingly, multilayer ceramic composites as are in current use are basically limited to layers comprising insulators (the ceramic) and conductors (the metallurgy involved), and when it is desired to derive some function other than an insulating or conducting function from the multilayer ceramic composite, it is necessary to attach a micro-miniature discrete device thereto, after the fabrication of the multilayer ceramic composite, for example, a discrete decoupling capacitor.

Such multilayer ceramic composites are described in, for example, "Laminated Ceramics", Schwartz, et al., Proc. Electron. Comp. Conf. (Washington, D. C., 1967), page 17; "Ceramics for Packaging", Wilcox, Solid State Technology, 14, 1971, page 40; "A Fabrication Technique for Multi-layer Ceramic Modules", Kaiser, et al., Solid State Technology, May 1972, page 35; and "Metal-Ceramic Constraints for Multi-layer Electronic Packages", Chance, et al., Proceedings of the IEEE, 59, 1455 (1971).

Some experimenters have reported the development of low temperature high dielectric constant squeegee paste formulations for screening applications. These screen deposited high dielectric films (approximately 1 to 2 mils thick) remain porous after sintering. Specialized processing techniques coupled with vitreous encapsulants are used to achieve dielectric films with high capacitance values.

SUMMARY OF THE INVENTION

The present invention provides ceramic compositions which comprise a refractory skeleton and lead silicate based interstitial glass which simultaneously serves as a bonding and fluxing agent which enables the ceramic compositions to densify in the low temperature range. The ceramic compositions of the present invention have a high dielectric constant but nonetheless can be densified at relatively low temperatures, thereby providing sintered ceramics that are non-porous by the Zyglo dye test and 0% porous by the water absorption test.

The ceramic compositions of the present invention find particular application in multilayer ceramic composites as heretofore described; due to their high dielectric constant and capability of being sintered at relatively low temperatures they can be used to provide a multilayer ceramic composite with in situ capability other than insulating or conducting capability, e.g., they can be formed in situ as a layer or as a multilayer entity insert in the multilayer ceramic composite.

It is thus one object of the present invention to provide ceramic compositions have a high dielectric constant.

It is a further object of the present invention to provide ceramic compositions which can be sintered at relatively low temperatures in an oxidizing atmosphere.

Yet another object of the present invention is to provide ceramic compositions which densify during sintering to maximum density values, thereby exhibiting 0% water absorption and non-porosity by the Zyglo dye test.

Still a further object of the present invention is to provide ceramic compositions which exhibit low linear shrinkage during sintering.

Yet a further object of the present invention is to provide ceramic compositions which find particular usage in the fabrication of multilayer ceramic composites useful in the fabrication of high speed computer circuits.

BRIEF DESCRIPTION OF THE DRAWINGS

FIG. 1 illustrates a typical multilayer ceramic composite utilizing the ceramic compositions of the present invention.

FIG. 2 illustrates a further embodiment of a multilayer ceramic composite using the ceramic compositions of the present invention.

DETAILED DESCRIPTION OF THE INVENTION

The two essential components of the ceramic compositions of the present invention are a skeleton and an interstitial glass.

The skeleton is the primary constituent in the ceramic compositions of the present invention, and the exact identity of the skeleton material is not especially limited. The skeleton material generally consists of one or more polycrystalline materials, and among the high temperature ceramic refractories that may be used as the skeleton are the titanates, such as barium titanate, lead titanate and the like, combination blends such as titanates-zirconates, titanates-stannates, and the like, and complex dielectric materials such as lead bismuth niobate-barium titanate blends [available as Ticon BC(PBN)].

These high temperature ceramic refractories, when used by themselves, are capable of providing high to very high dielectric constants, in fact, the dielectric constants obtained are considerably higher than the values obtained with the ceramic compositions of the present invention. However, in order to achieve these higher values, much higher sintering temperatures are required for densification.

One substantial benefit obtained from the ceramic compositions of the present invention is that they can be densified at much lower sintering temperatures than are required for the high temperature ceramic refractories alone, and still provide dielectric constant values adequate for ceramic compositions for most high speed computer circuit designs involving multilayer ceramic composites.

The second essential component of the ceramic compositions of the present invention is an interstitial glass.

As opposed to the skeleton, which can be formed of substantially any polycrystalline high temperature ceramic refractory illustrating a high dielectric constant and appropriate electrical properties, it has been found that only the lead silicate based glasses permit the objects of the present invention to be achieved, i.e., to permit the ceramic compositions to be densified and simultaneously high dielectric constants to be achieved at low sintering temperatures. Through the use of the lead silicate based glasses, dense ceramic structures which are non-porous by the Zyglo dye test and 0% porous by the A.S.T.M. water absorption test are obtained.

The lead silicate based glasses used in the present invention are essentially simple ceramic frits. Frits are special glasses that fall into three broad categories: low, medium and high temperature frits. The ceramic frits of the present invention are low temperature frits which, as indicated, function jointly as a bonding agent and as a fluxing agent to simultaneously hold the skeleton together and provide a ceramic dielectric that vitrifies in a low temperature range.

The ceramic frits of the present invention are simple two or three component frits. The preferred ceramic frits are members of the binary system $PbO-SiO_2$ and the ternary systems $PbO-Al_2O_3-SiO_2$ and $PbO-ZrO_2-SiO_2$.

The lead silicate based glasses of the present invention also offer the advantages of providing sintered products with smooth surfaces which are water repellent. These properties are highly desirable for high humidity applications. With other glasses, generally under such conditions the dissipation factor of the sintered product becomes very erratic, and increases quite rapidly. This is a further substantial benefit obtained upon the use of the lead silicate based glasses of the present invention.

The lead silicate based glasses of the present invention also do not contain alkali metal ions which are highly deleterious to powered units where electrolytic conduction could take place over a period of time.

In formulating the ceramic compositions of the present invention, one factor which should be kept in mind is that generally the ceramic compositions of the present invention will illustrate a lowered dielectric constant as compared to the refractory component per se. Accordingly, in selecting the polycrystalline high temperature ceramic refractory the decrease in dielectric constant due to the lead silicate based interstitial glass should be taken into account. This is one of the few limitations on the selection of the polycrystalline high temperature ceramic refractory which is used in forming the ceramic compositions of the present invention.

The proportions of the skeleton and interstitial glass in the ceramic compositions of the present invention are established upon a consideration of the following factors.

The skeleton constitutes the major phase of the ceramic composition of the present invention, consisting of polycrystalline high temperature ceramic refractories. It is the skeleton that provides the dielectric properties, such as high dielectric constant, low dissipation factor, high dielectric strength and ohmic resistance to the ceramic compositions of the present invention. The skeleton thus comprises the majority of the ceramic composition of the present invention.

Accordingly, the interstitial glass is used in a much lower proportion. The interstitial glass constitutes the amorphous phase, and serves to bond the polycrystalline high temperature ceramic refractory together, simultaneously serving as a fluxing agent (liquid phase sintering) that permits dense articles to be sintered at low temperatures which are impervious to moisture. The percentage of the interstitial glass used is kept as low as possible compatible with the above functions. The later described preferred interstitial glasses provide the highest achievable dielectric constants with the ceramic compositions of the present invention, i.e., dielectric constants that are approximately one-third that of the dielectric constant of the starting polycrystalline high temperature ceramic refractory. This factor was earlier discussed, and should be taken into consideration in selecting the starting refractory material.

Balancing all factors, the lead silicate based glasses generally provide the entire vitreous phase of the ceramic compositions of the present invention, and are present in an amount of from 20 to 30 wt. % of the ceramic compositions of the present invention, the balance (80 to 70 wt. %) being the refractory skeleton.

In the most preferred compositions of the present invention, the weight percentage of interstitial glass never exceeds about one-third that of the skeleton (major phase) percentage. The general rule is that the higher the percentage of interstitial glass, the lower the resultant dielectric constant for a particular composition.

Utilizing lead silicate based glasses in the above percentages balances the necessity to achieve densification in the lower temperature ranges against lowering the high dielectric constant of the refractory skeleton. It is quite possible, in this regard, that the only suitable interstitial glasses that permit high dielectric constant ceramics to be obtained which can be vitrified at low temperatures are the simple binary and ternary lead silicates.

Having thus described the ceramic compositions of the present invention in general, it is believed appropriate to reiterate with some specificity some of the outstanding advantages thereof.

One of the primary advantages of the ceramic compositions of the present invention is that they densify in the low temperature sintering range of about 800° to about 950°C., which is compatible with conventional device metallurgy as is commonly used in multilayer ceramic composites.

A further advantage possessed by the ceramic compositions of the present invention is that they can be sintered in an oxidizing atmosphere. This is advantageous because firing in a reducing atmosphere will often cause an undesirably high dissipation factor in ceramics.

The ceramic compositions of the present invention also show low fired linear shrinkages as compared to ceramic compositions of the prior art, e.g., fired linear shrinkages on the order of 7 to 12% can be achieved.

An additional primary advantage of the ceramic compositions of the present invention is that they permit one to fabricate multilayer ceramic composites with layers which can exhibit dielectric constants over a wide range, e.g., in the range of from about 230 to about 550, providing excellent capability for forming layer capacitors.

The ceramic compositions of the present invention can be processed by several well-known ceramic processes. The compositions can be processed to provide screen-deposited high dielectric films or processed into thin sheets (approximately 5 to 20 mils thick). In either case, film capacitors of the desired capacitance range for most high speed computer design applications can be sintered to achieve maximum density values in the lower temperature ranges. The compositions can be processed to provide micro-miniature chip capacitors. One object of the present invention is to eliminate micro-miniature discrete chip capacitors and the additional costly processing step of bonding the chips to the multilayer ceramic composite by surface metallurgy. In their place film capacitors (thin dielectric ceramic layers) will be co-laminated in situ in the multilayer ceramic composite and co-sintered. It is preferred in electrical designs that the capacitors be placed as close to the circuit functions as the circuit design calls for and physically permits.

The ceramic compositions of the present invention further illustrate a dissipation factor which can range from about 0.0069 to about 0.0243, and at a layer thickness of 6 mils provide a capacitance in the range of 2,000 PF/in$^2$ to 20,000 PF/in$^2$, more than adequate to meet the capacitor range for decoupling capacitors used in digital computer applications.

The capability of the ceramic compositions of the present invention to be formed into thin green ceramic sheets by slip casting doctor blade techniques is highly advantageous and will be discussed in greater detail. This capability enables the ceramic compositions of the present invention to be processed as thin green layers, for example, on the order of 0.005 inch to 0.020 inch which can be layer stacked, co-laminated and co-sintered to form multilayer ceramic composites.

In forming a layer of the ceramic composition of the present invention, the first procedural step is generally to classify the starting materials of the present invention to the desired size and purity. Usually the ceramic and glass materials used have a size in the range of from about 1 micron to about 10 microns and have a surface area of from about 3 to about 10 m$^2$/g. The lead silicate based glasses, being amorphous, are fractured particles and therefore have an irregular shape. The high temperaure ceramic refractories are crystalline, and therefore generally have a definite shape. However, they can range from granular to elongated and can comprise irregular particles.

Most preferably, the materials are of high purity so as to avoid extraneous elements affecting the electrical characteristics of the end device. For instance, generally no more than traces of alkali materials will be present since such materials raise the dissipation factor of the ceramic composition of the present invention.

The classified ceramic material and glass can be blended by an appropriate dry blending or wet blending technique, wet blending typically being with water. If the materials are dry blended, they can be immediately formed into a casting slip for sheet formation. If the materials are wet blended, water is removed by evaporation or filtration. Generally, the materials are then again characterized so as to obtain the desired mesh size for forming the casting slip, typically on the order of about −80 mesh to about +100 mesh.

The materials are then blended to form a casting slip appropriate for green sheet formation. Casting slip formulations as are typically used in the art can be used with success to form a casting slip comprising the ceramic composition of the present invention. Such casting slips generally comprise the ceramic composition of the present invention, a temporary binder resin which is removed during the sintering step, for example, polyvinyl butyral, polymethyl methacrylate, and the like, a solvent such as methyl alcohol, methylene chloride, perchloroethylene and the like, and various additives to control the drying time, etc., of the castig slip. Representative of the slip casting compositions (as can be used) are those disclosed in R. E. Mistler, Bull. Am. Ceramic Soc., Vol. 92(11), pages 850–854 (1973); H. D. Kaiser, et al., Solid State Technology, May 1972, page 35; and U.S. Pat. No. 2,966,719 Parks.

It is desirable that the casting slip contain the maximum pigment volume concentration (minimum binder) compatible with easy casting (to avoid the occurrence of pinholes) and later processing step, e.g., lamination.

The casting slip is then cast to the desired thickness, typically on the order of 5 to 20 mils in the green state, and solvent removed to provide a dimensionally stable cast green sheet. At this stage of the processing the green sheet may be blanked by known procedures and punched, if desired, for example, mechanically, by a laser or by an electron beam, to provide the necessary alignment and device interconnection holes, and then printed, for example, screen printed, to provide the necessary metallurgy for the holes in the Z-direction using appropriate metallurgy.

As will be apparent to one skilled in the art, the metallurgy is selected so as to be compatible with the sintering temperatures later involved, and is most typically a noble metal or combination of noble metals such as platinum, gold-platinum, gold, silver or the like. Palladium should not be used when the compositions of the present invention contain bismuth.

The metallurgy can be formed from commercially available electrode pastes, some of which are specifically designed for high dielectric constant ceramics. Squeegee pastes provide acceptable bonding at the ceramic-to-metal interface to give good pull strength to pin-soldering or pin-butt-brazing. The metallurgy should not go into solution when exposed to soldering and brazing.

If top surface metallurgy is being applied, it should be capable of bonding micro- miniature discrete devices (active) such as silicon chips and the like. Top surface metallurgy lends itself readily and economically to plating which prevents corrosion if the top surface metallurgy is exposed to rigorous or hostile environments.

The metallurgy system selected should, of course, provide low resistivity values, e.g., ohms/square for a 5 mil to 10 mil wide line for lines anywhere from ⅛ inch to over 3 inches long with line resistivity values that range from 0.15 to 0.35Ω/inch.

While the green sheet can, in theory, be used without lamination to other green sheets if it is thick enough, generally it will be laminated to other green sheets of a similar or different composition to form a composite assembly to yield the final monolithic device. For instance, such other green sheets can be formed not only from similar or identical high dielectric constant ceramic composition but from low dielectric constant ceramic compositions are are disclosed in U.S. Pat. No. 3,540,894 McIntosh entitled "Eutectic Lead Bisilicate Ceramic Compositions and Fired Ceramic Bodies" or as disclosed in copending U.S. Pat. application Ser. No. 449,564 filed Mar 8, 1974 entitled "Ceramic Compositions Sinterable at Low Temperatures, Low Dielectric Constant Ceramic Articles Made Therefrom and Process for Forming the Same", filed in the name of Charles M. McIntosh, both of which are hereby incorporated by reference.

The stacked assembly is laminated at an appropriate pressure, temperature and time and thereafter placed on a flat refractory plate for sintering. A refractory plate is used even though the green sheet is self-supporting since the ceramic composition of the present invention will not adhere to the refractory plate during sintering.

Typical laminating conditions involve temperatures of about 175°F to about 225°F and pressures of from about 800 to about 1300 psi. These pressures are lower than those used with standard multilayer ceramic compositions. Excessively high pressure should be avoided as these will result in layer delamination and unacceptable enveloping of internal metallurgy.

Lamination for a particular monolithic structure is, of course, conducted for a sufficient time to achieve the desired bonding effect and the exact duration of lamination is not critical. For instance, lamination for about 10 minutes at the above conditions, with the first two minutes of lamination being at about half pressure to allow entrapped air to escape, the presence of which may result in delamination, generally provides excellent results.

The refractory plate should be ground flat since the green sheet assembly will assume the flatness of the plate, and the fired surface will only be as good as the surface of the green sheet, and fired camber will only be as good as the green chamber. Generally, sintered multilayer ceramic modules with a chamber of 0.004 in/mil are considered acceptable.

Fired dimensional tolerances must be maintained so that the sintered parts fit mechanical fixtures, etc., for subsequent or post-sintering operations, for example, pin-butt-brazing and the like.

The stacked, laminated assembly of green sheets on the refractory plate is then sintered at temperatures of from about 800° to 950°C. in an oxidizing atmosphere, typically in a continuous belt furnace carried on a Nichrome metal belt. As earlier indicated, one advantage of the ceramic compositions of the present invention is that they can be sintered in an oxidizing atmosphere (usually air sintering). Sintering in a reducing atmosphere must be avoided.

The exact sintering conditions and heat treatment cycles are established upon a consideration of thermogravimetric (T.G.A.) and differential thermal analysis curves (D.T.A.) in a manner known to the art. Binder burn-off is generally achieved at 25°C to 500°C, with the peak temperatures of about 850° to about 950°C being maintained for about 1 to about 4 hours, more preferably 1-½ to about 2 hours, to achieve optimum densification.

The belt speed, if a continuous belt furnace is used, will depend on the type of furnace used, and is generally established to provide complete binder burn-off in combination with a peak temperature duration as earlier described.

A representative time for a complete sintering cycle is about 22 hours to insure complete binder burn-off, though it will be appreciated that greater and lesser times can be used depending upon the binder, proportion of binder and like factors.

For computer circuit applications, the final sintered parts should pass both the Zyglo dye test for porosity and the water absorption test, signifying that optimum densification has been obtained.

During sintering the lead silicate based glass fuses and bonds the polycrystalline high temperature ceramic refractory to provide a ceramic layer in accordance with the present invention, the final layer typically illustrating post-sintering density values of about 4.38 to about 6.49 gms/cc.

The resulting multilayer ceramic composite can then, if desired, be subjected to standard post-sintering procedures as are known to the art.

Several preferred lead silicate based glasses are described below.

1. Tribasic Lead silicate (a) Molecular Formula
　　PbO.0.33 $SiO_2$　　　　　　　　Mol. wt
　　　　　　　　　　　　　　　　　　243.27

(b) Chemical Oxides　　　　　　　　Wt. %
　　Lead Oxide (PbO)　　　　　　　91.5~ 92.5
　　Silica ($SiO_2$)　　　　　　　　 8.5~  7.5
　　　　　　　　　　　　Total　　100.0 100.0

(c) Typical Impurities
　　Oxides, etc.　　　　　　　　　　Wt. %
　　$Ag_2O$　　　　　　　　　　　　0.0008
　　$Cu_2O$　　　　　　　　　　　　0.0010
　　$As_2O_5$, $Sb_2O_5$, $\gamma$-$SnO_2$　　0.0015
　　ZnO　　　　　　　　　　　　　　0.0008
　　$Fe_2O_3$　　　　　　　　　　　 0.0050
　　$Bi_2O_3$　　　　　　　　　　　 0.0080

(d) Physical Properties
　　Yellow, fritted crystals
　　Specific gravity　　7.50~7.60
　　Melting range　　　 677~732°C.
　　Mesh — 325　　　　　98.6%

2. Lead Monosilicate (a) Molecular Formula
　　PbO.0.67 $SiO_2$　　　　　　　　Mol. wt.
　　　　　　　　　　　　　　　　　　203.27

(b) Chemical Oxides　　　　　　　　Wt. %
　　Lead Oxide (PbO)　　　　　　　84.5~ 85.5
　　Silica ($SiO_2$)　　　　　　　　15.5~ 14.5
　　　　　　　　　　　　Total　　100.0 100.0

(c) Typical Impurities
　　Same as Tribasic Lead Silicate (d) Physical Properties
　　Light yellow, fritted crystals
　　Specific gravity　　6.50~6.65
　　Melting range　　　 677~732°C.
　　Mesh — 325　　　　　98.6%

3. Lead Alumina Bisilicate (a) Molecular Formula
　　PbO . 0.03 $Al_2O_3$ . 1.95 $SiO_2$　　Mol. wt. 393.47

(b) Chemical Oxides　　　　　　　　Wt. %
　　Lead Oxide (PbO)　　　　　　　65.0
　　Alumina ($Al_2O_3$)　　　　　　 1.0
　　Silica ($SiO_2$)　　　　　　　　34.0
　　　　　　　　　　　　Total　　100.0

(c) Typical Impurities
　　Same as Lead Monosilicate (d) Physical Properties
　　Light yellow, fritted crystals
　　Specific gravity　　4.60~4.65
　　Melting range　　　 788~816°C.
　　Mesh — —325
　　88.1%

4. Eutectic Lead Bisilicate (a) Molecular Formula
　　PbO.0.249 $Al_2O_3$. 1.903 $SiO_2$　　Mol. wt. 362.88

(b) Chemical Oxides　　　　　　　　Wt. %
　　Lead Oxide (PbO)　　　　　　　61.35
　　Alumina ($Al_2O_3$)　　　　　　 7.12

-continued

| | | | |
|---|---|---|---|
| | Silica ($SiO_2$) | | 31.53 |
| | | Total | 100.00 |

5. Lead Zirconium Silicate (a) Molecular Formula
$PbO \cdot ZrO_2 \cdot SiO_2$ $PbZrSiO_5$  Mol. wt. 406.49

(b) | Chemical Oxides | Wt. % |
|---|---|
| Lead Oxide (PbO) | 54.91 |
| Zirconia ($ZrO_2$) | 30.31 |
| Silica ($SiO_2$) | 14.78 |
| Total | 100.00 |

Blends of the above materials can, of course, be used, and it is to be clearly understood that the above materials are merely representative of preferred components for use in the present invention.

The formulae of several preferred polycrystalline high temperature ceramic refractories are given below.

1. Barium Titanate (a) Barium Titanate
 (i) Molecular Formula

| $RO/R_2O$ | $R_2O_3$ | $RO_2$ |
|---|---|---|
| 0.9932 BaO | | 0.9863 $TiO_2$ |
| | 0.0080 $Al_2O_3$ | |
| 0.0012 SrO | | |
| | | 0.0158 $SiO_2$ |
| 0.0056 $Na_2O$ | | |
| 1.0000 | | |

- $BaTiO_3$ - or - $BaO \cdot TiO_2$ (ii) Molecular Weight = 233.20
 (iii) Chemical Analysis

| Oxides | Wt. % |
|---|---|
| BaO | 63.8 – 64.2 |
| $TiO_2$ | 33.5 – 33.9 |
| Impurities Oxides | Wt. % |
| $Al_2O_3$ | 0.35 (max.) |
| $SiO_2$ | 0.5 (max) |
| SrO | 1.0 (max.) |
| $Na_2O$ | 0.15 to 0.25 |
| Ignition Loss | 0.75 (max.) |

(iv) Properties
   Approx. m.p.  1650°C
   Specific Gravity  5.95
   Dielectric Properties at 25°C - 1 KHz
   Dielectric Constant (K) - 1250 to 1500
   Power Factor (P.F.) - 1.0% (max.)
   Sieve Analysis - 0.1% max. + 325 mesh
   Particle Size - 0.5 to 3.0 microns (b) Barium Titanate
   (PTC Thermistor Grade)
   BT (TH - BP - 120°C) - Mol. Wt. - 223.47
   -$Ba_{0.997} \cdot La_{0.003} \cdot TiO_3$ Note: All grades of commercially available known titanates will provide high dielectric constants, e.g.
- Capacitor Grade - $BaTiO_3$
- Piezoelectric Grade - $BaTiO_3$
- Thermistor Grade - $BaTiO_3$ However, thermistor grade barium titanate, especially BT (TH-BP-120°C), provides higher dielectric constants than other grades of barim titanate.

2. Lead Zirconate Titanate (a) Molecular Formula

| 0.940 PbO | 0.530 $ZrO_2$ |
|---|---|
| 0.060 SrO | 0.470 $TiO_2$ |
| 1.000 | 1.000 |

$Pb_{0.94} \cdot Sr_{0.06} \cdot Zr_{0.53} \cdot Ti_{0.47} \cdot O_3$ (b) Molecular Weight = 325.86

(c) Chemical Analysis

| Oxides | Wt. % |
|---|---|
| PbO | 64.8 |
| $ZrO_2$ | 20.6 |
| $TiO_2$ | 11.8 |
| SrO | 2.23 |
| $SiO_2$ | 0.02 |
| Others | 0.55 |
| Total | 100.00 |

(d) $PbO \cdot ZrO_2$  52.5 mol. %
    $PbO \cdot TiO_2$  47.5 mol. %

3. Complex Dielectric Material (a) Molecular Formula

| $RO/R_2O$ | $R_2O_3$ | $RO_2$ |
|---|---|---|
| 0.9669 BaO | 0.0075 $Al_2O_3$ | 0.9601 $TiO_2$ |
| 0.0268 PbO | 0.0268 $Bi_2O_3$ | |
| 0.0010 SrO | 0.0268 $Nb_2O_5$ | 0.0129 $SiO_2$ |
| 0.0053 $Na_2O$ | | |
| 1.0000 | | |

(b) Molecular Weight 252.50

(c) Chemical Analysis

| Oxides | Wt. % |
|---|---|
| BaO | 58.71 |
| PbO | 2.37 |
| SrO | 0.04 |
| $Na_2O$ | 0.13 |
| $Al_2O_3$ | 0.30 |
| $Bi_2O_3$ | 4.95 |
| $Nb_2O_5$ | 2.82 |
| $TiO_2$ | 30.38 |
| $SiO_2$ | 0.30 |
| Total | 100.00 |

This ceramic blend can be approximated by adding 10% lead bismuth niobate to barium titanate or by other ceramic formulations.

Lead Bismuth Niobate - $PbBi_2Nb_2O_9$ or $PbO \cdot Bi_2O_3 \cdot Nb_2O_5$

The above blend is commercially available as Ticon BC(PBN).

Sintering temperature: 2 hrs at 1205°C
Dielectric Properties at 25°C = 1 KHz
Dielectric Constant (K) = 1450 to 1550
Power Factor (P.F.) = 2% max.

4. Bismuth Zirconate (a) Molecular Formula
    $2Bi_2O_3 \cdot 3ZrO_2$ - Mol. Wt. - 1301.66

(b) Chemical Analysis

| Oxides | Wt. % |
|---|---|
| $Bi_2O_3$ | 71.8 |
| $ZrO_2$ | 26.5 |
| $SiO_2$ | 1.0 |
| Ignition Loss | 0.09 |
| Total | 99.39 |

(c) Properties
    Specific Gravity  7.92
    Sieve Analysis  0.1% max. + 325 mesh
    Particle Size  0.5 to 3.0 microns 5. Bismuth Titanate (a) Molecular Formula
    $Bi_2Ti_2O_7$ or $Bi_2O_3 \cdot 2TiO_2$ (b) Molecular Weight = 625.80

(c) Chemical Analysis

| Oxides | Wt. % |
|---|---|
| $Bi_2O_3$ | 72.0 to 74.0 |
| $TiO_2$ | 27 to 25.0 |
| Loss on Ignition | 0.2 |

(d) Properties

| | |
|---|---|
| Specific Gravity | 7.61 |
| Sieve Analysis | 15.0% max + 325 mesh |
| Particle Size | 0.5 to 3.0 microns |
| Temperature Coefficient | - P-100 |
| T.C. is positive -+T 100 p/m/0c. | |

All of the above ceramic materials are commercially available as high dielectric materials.

Similarly, the lead silicate based glasses are commercially available and are now used extensively in the glaze and porcelain enamel industries. For the first time, they are used as liquid phase sintering materials that are compatible with the high temperatures, high dielectric constant ceramic materials. It should also be noted that lead compounds when reacted (chemically) and fritted to form lead based silicates are safe to handle as compared to raw lead oxides, etc., which are quite toxic. As fluxing agents, they impart a self-glazing surface to the sintered ceramic part, providing surface finishes on the order of 8–15 C.L.A. microinches. This surface finish lends itself well to metal deposition by methods other than screening, if desired.

The above materials are exemplary of the preferred polycrystalline, high temperature, ceramic refractory components. This component preferably has a medium-high sintering temperature (alone) of from about 1250° to about 1450°C to optimum densification; a dielectric constant of from about 1100 to about 1500 and a dielectric strength of from about 150 to about 200 volts/mil. The dielectric constant can, of course, be somewhat higher and lower, keeping in mind the heretofore provided indication that the final sintered ceramic/glass product will have a dielectric constant on the order of one-third that of the ceramic per se at the preferred blending ratios thereof.

Blends of the above materials can, of course, be used, and it is to be clearly understood that the above materials are merely representative of preferred components for use in the present invention.

Having thus generally described the present invention, the following Examples are offered.

EXAMPLES

Ceramic compositions 1 to 6 were formed to have the compositions given below.

CERAMIC COMPOSITIONS 1–6

| No. 1 | $RO/R_2O$ | $R_2O_3$ | $RO_2$ |
|---|---|---|---|
| | 0.8394 BaO | | 0.8335 $TiO_2$ |
| | 0.1549 PbO | 0.0066 $Al_2O_3$ | 0.2370 $ZrO_2$ |
| | 0.0047 $Na_2O$ | 0.0485 $Bi_2O_3$ | 0.1750 $SiO_2$ |
| | 0.0009 SrO | | |
| | 0.9999 | | |

Molecular Weight
  Anhydrous — 293.25

| Oxides | Mol. % | Wt. % |
|---|---|---|
| BaO | 36.49 | 33.89 |
| PbO | 6.73 | 11.79 |
| SrO | 0.04 | 0.03 |
| $Na_2O$ | 0.20 | 0.10 |
| $Al_2O_3$ | 0.29 | 0.23 |
| $Bi_2O_3$ | 2.11 | 7.70 |
| $TiO_2$ | 36.23 | 22.72 |
| $ZrO_2$ | 10.30 | 9.96 |
| $SiO_2$ | 7.61 | 3.58 |
| Total | 100.01 | 100.00 |

CERAMIC COMPOSITIONS 1–6

| No. 2 | $RO/R_2$ | $R_2O_3$ | $RO_2$ |
|---|---|---|---|
| | 0.6912 BaO | 0.0058 $Al_2O_3$ | 0.8479 $TiO_2$ |
| | 0.3038 PbO | 0.1118 $Bi_2O_3$ | 0.3321 $ZrO_2$ |
| | 0.0038 $Na_2O$ | 0.0203 $Nb_2O_5$ | 0.2969 $SiO_2$ |
| | 0.0008 SrO | | |
| | 0.9996 | | |

Molecular Weight
  Anhydrous — 358.25

| Oxides | Mol. % | Wt. % |
|---|---|---|
| BaO | 26.44 | 27.59 |
| PbO | 11.62 | 18.93 |
| $Na_2O$ | 0.15 | 0.05 |
| SrO | 0.01 | 0.01 |
| $Al_2O_3$ | 0.22 | 0.16 |
| $Bi_2O_3$ | 4.28 | 14.55 |
| $Nb_2O_5$ | 0.78 | 2.24 |
| $TiO_2$ | 32.44 | 18.91 |
| $ZrO_2$ | 12.71 | 10.58 |
| $SiO_2$ | 11.32 | 4.98 |
| Total | 99.97 | 100.00 |

| No. 3 | $RO/R_2O$ | $R_2O_3$ | $RO_2$ |
|---|---|---|---|
| | 0.7667 BaO | | 0.1714 $SiO_2$ |
| | 0.2279 PbO | 0.0069 $Al_2O_3$ | 0.0780 $ZrO_2$ |
| | 0.0042 $Na_2O$ | 0.0462 $Bi_2O_3$ | 0.7613 $TiO_2$ |
| | 0.0012 SrO | | |
| | 1.0000 | | |

Molecular Weight
  Anhydrous — 271.76

| Oxides | Mol. % | Wt. % |
|---|---|---|
| BaO | 37.15 | 43.27 |
| PbO | 11.05 | 18.72 |
| $Na_2O$ | 0.20 | 0.10 |
| SrO | 0.06 | 0.04 |
| $Al_2O_3$ | 0.30 | 0.22 |
| $Bi_2O_3$ | 2.23 | 7.92 |
| $SiO_2$ | 8.30 | 3.78 |
| $ZrO_2$ | 3.80 | 3.56 |
| $TiO_2$ | 36.96 | 22.39 |
| Total | 99.99 | 100.00 |

| No. 4 | $RO/R_2O$ | $R_2O_3$ | $RO_2$ |
|---|---|---|---|
| | 0.7527 BaO | | 0.7477 $TiO_2$ |
| | 0.0009 SrO | 0.0062 $Al_2O_3$ | 0.0977 $SiO_2$ |
| | 0.0044 $Na_2O$ | 0.0953 $Bi_2O_3$ | 0.0768 $ZrO_2$ |
| | 0.2420 PbO | | |
| | 1.0000 | | |

Molecular Weight
  Anhydrous — 266.62

| Oxides | Mol. % | Wt. % |
|---|---|---|
| BaO | 38.14 | 43.30 |
| SrO | 0.05 | 0.04 |
| $Na_2O$ | 0.22 | 0.10 |
| PbO | 12.26 | 20.26 |
| $Al_2O_3$ | 0.31 | 0.24 |
| $Bi_2O_3$ | 2.30 | 7.93 |
| $TiO_2$ | 37.88 | 22.37 |
| $SiO_2$ | 4.95 | 2.20 |
| $ZrO_2$ | 3.89 | 3.55 |
| Total | 100.00 | 99.99 |

| No. 5 | $RO/R_2O$ | $R_2O_3$ | $RO_2$ |
|---|---|---|---|
| | 0.9587 PbO | | 0.1093 $SiO_2$ |
| | 0.0413 SrO | 0.0578 $Bi_2O_3$ | 0.4645 $ZrO_2$ |
| | 1.0000 | | 0.3298 $TiO_2$ |

Molecular Weight — 335.07

| Oxides | Mol. % | Wt. % |
|---|---|---|
| PbO | 49.00 | 63.86 |
| SrO | 2.11 | 1.31 |
| $Bi_2O_3$ | 2.95 | 8.04 |
| $SiO_2$ | 5.59 | 1.96 |
| $ZrO_2$ | 23.74 | 17.08 |
| $TiO_2$ | 16.60 | 7.74 |
| Total | 99.99 | 99.99 |

| No. 6 | $RO/R_2O$ | $R_2O_3$ | $RO_2$ |
|---|---|---|---|

CERAMIC COMPOSITIONS 1–6

| | | |
|---|---|---|
| 0.4217 BaO | | 0.1027 $SiO_2$ |
| 0.5571 PbO | 0.0033 $Al_2O_3$ | 0.2473 $ZrO_2$ |
| 0.0188 SrO | 0.0509 $Bi_2O_3$ | 0.5617 $TiO_2$ |
| 0.0023 $Na_2O$ | | |
| 0.9999 | | |

Molecular Weight
    Anhydrous — 296.59

| Oxides | Mol. % | Wt. % |
|---|---|---|
| PbO | 28.29 | 41.93 |
| BaO | 21.45 | 21.80 |
| SrO | 0.96 | 0.66 |
| $Na_2O$ | 0.12 | 0.15 |
| $Al_2O_3$ | 0.17 | 0.12 |
| $Bi_2O_3$ | 2.59 | 8.00 |
| $SiO_2$ | 5.22 | 2.08 |
| $ZrO_2$ | 12.58 | 10.27 |
| $TiO_2$ | 28.57 | 15.13 |
| Total | 99.95 | 100.03 |

These are preferred raw materials and compositions. Other materials could be used to approximate these ingredients and achieve the same end-product results. Other percentages could be used, but these provided the highest and most useful compositions to provide the desired range of capacitance.

These preferred ceramic compositions were formed from the following batch formulations.

Ceramic Composition
Batch Formulations                Wt. %

| Materials | No. 1 | No. 2 | No. 3 | No. 4 | No. 5 | No. 6 |
|---|---|---|---|---|---|---|
| Barium Titanate | 60.0 | | 60.0 | 60.0 | | 30.0 |
| Ticon-BC | | 50.0 | | | | |
| Lead Zirconate Titanate | | | | | 60.0 | 30.0 |
| Bismuth Zirconate | 20.0 | 10.0 | 20.0 | 20.0 | 20.0 | 20.0 |
| Bismuth Titanate | | 10.0 | | | | |
| Lead Zirconium Silicate | 20.0 | 30.0 | | | | |
| Lead Monosilicate | | | 20.0 | | | |
| Tribasic Lead Silicate | | | | 20.0 | 20.0 | 20.0 |
| Total | 100.0 | 100.0 | 100.0 | 100.0 | 100.0 | 100.0 |

Chemical Analysis

| Oxides | No. 1 | No. 2 | No. 3 | No. 4 | No. 5 | No. 6 |
|---|---|---|---|---|---|---|
| PbO | 11.79 | 18.93 | 18.72 | 20.26 | 63.86 | 41.93 |
| BaO | 43.89 | 29.59 | 43.27 | 43.30 | — | 21.80 |
| $Na_2O$ | 0.10 | 0.05 | 0.10 | 0.10 | — | 0.05 |
| SrO | 0.03 | 0.01 | 0.04 | 0.04 | 1.31 | 0.66 |
| $Al_2O_3$ | 0.23 | 0.16 | 0.22 | 0.24 | — | 0.17 |
| $Bi_2O_3$ | 7.70 | 14.55 | 7.92 | 7.93 | 8.04 | 8.00 |
| $Nb_2O_5$ | — | 2.24 | — | — | — | — |
| $TiO_2$ | 22.72 | 18.91 | 22.39 | 22.37 | 7.74 | 15.13 |
| $ZrO_2$ | 9.96 | 10.58 | 3.56 | 3.55 | 17.08 | 10.27 |
| $SiO_2$ | 3.58 | 4.98 | 3.78 | 2.20 | 1.96 | 2.08 |
| Total | 100.00 | 100.00 | 100.00 | 100.00 | 100.00 | 100.00 |

A specific casting slip system for Batch Formulation No. 4 described above is given below along with a description of processing the same to a fired ceramic in accordance with the present invention.

A. Batch Formulation No. 4

1) Ceramic

| | Wt. % | Wt. (gms) | S.G.* | Vol (c.c.) |
|---|---|---|---|---|
| Barium Titanate | 60.0 | 240.0 | 5.95 | 40.34 |
| Bismuth Zirconate | 20.0 | 80.0 | 7.92 | 10.10 |
| Tribasic Lead Silicate | 20.0 | 80.0 | 7.52 | 10.64 |
| Total | 100.2 | 400.0 | | 61.08 |

* Abbreviation for Specific Gravity
2) Density = 6.55 gms/c.c.

B. Binder

1) Materials

| | Wt. % | Wt. (gms) | S.G. | Vol. (c.c.) |
|---|---|---|---|---|
| Polymethyl Methacrylate* | 11.26 | 20.27 | 0.982 | 20.64 |
| Dioctyl Phthalate | 11.26 | 20.27 | 0.970 | 20.90 |
| Methylenechloride | 41.70 | 75.20 | 0.991 | 75.88 |
| Perchloroethylene | 35.70 | 64.26 | 1.62272 | 39.60 |
| Total | 100.00 | 180.00 | | 157.02 |

*Rohm & Haas Acryloid B-44
2) Density = 1.15 gms/c.c.
3) Viscosity at 25°C = 75~80 c.p.s.

C. Ceramic/Binder

1) Ceramic/Binder Ratio: 2.22:1.00

2) Calculated Density = 2.65 gms/c.c.
   Measured Density = 2.30 gms/c.c.

3) Viscosity at 25°C.    at 20 r.p.m. = 1,000 cps
                          at 50 r.p.m. = 1,000 cps 4) Grind Guage           Dispersion
                          0 to 0.5 mil 5) Pigment Volume Concentration = 59.42%

6) Pigment Weight Concentration = 83.47%

Note: Above values are based on a 5 hour ball-milling period; the slip was de-aired about 5 minutes to remove excess air bubbles prior to casting.

After casting and drying at room temperature to remove solvent the green sheets (dried thickness = 8 ± 0.5 mils) were blanked into 3 inch × 5 inch squares and reference holes for accurate stacking and orientation mechanically punched therein.

Ten such blanks were stacked and laminated at 650 psi at 175°F for 2 minutes (half pressure) and then at 1300 psi and 175°F for 10 minutes.

The green composite thus formed was blanked to ensure final 2 inch × 2 inch nominal dimensions (allowing for the 7.4% linear shrinkage), placed on a refractory plate and sintered in air in a continuous belt furnace at the following conditions:

18 hour temperature elevation at constant rate from room temperature to final sintering temperature of 895° ± 25°C (binder burn-off substantially completed by 600°C.);

2 hours at final sintering temperature (895°±25°C.).

The sintered composite then passed through the cool down zone in the belt furnace and was removed from the furnace at room temperature.

Identical runs were performed except for substituting Batch Formations No. 1 – 3, 5 and 6 for Batch Formulation No. 4 with appropriate compensation for linear shrinkage and the results of product analysis are given in the Table below.

For purposes of simplicity in this Example, via holes were not punched nor was metallurgy applied.

ers, as illustrated in FIG. 2. For example, insert 30 comprises a high dielectric constant ceramic insert in accordance with the present invention in a low dielectric constant insulator layer 32, region 34 comprises a low dielectric constant insulator in a high dielectric constant ceramic layer 36 and finally, region 38 is a ferrite insert in a low dielectric constant layer 40.

Metallization lines for the plurality of layers in either of the multilayer ceramic composites of FIG. 1 or FIG. 2 can be formed by screening or other well-known techniques.

While the invention has been particularly shown and described with reference to preferred embodiments thereof, it will be understood by those skilled in the art that various changes in form and details may be made therein without departing from the spirit and scope of the invention.

What is claimed is:

1. A high dielectric constant ceramic body which is non-porous by the Zyglo dye test and 0% porous by the water absorption test, which has been sintered at a temperature of from about 850°C to about 950°C to densify said body, which consists essentially of a major portion of a polycrystalline ceramic refractory material and a lead silicate based interstitial glass selected from

| Electroceramic Properties of Sintered Bodies | | | | | | |
|---|---|---|---|---|---|---|
| Properties | No. 1 | No. 2 | No. 3 | No. 4 | No. 5 | No. 6 |
| Color- | Yellow | Lt. Yellow | Yellow | Orange | Orange | Orange |
| Density- | 4.63 | 4.96 | 4.60 | 4.38 | 6.49 | 5.03 |
| Shrinkage- | 7.0 | 8.2 | 7.5 | 7.4 | 11.8 | 7.3 |
| Camber- | | 0.004″/Mil | | | | |
| Thermal-Expansion | 81.0 | 83.0 | 85.0 | 80.0 | 80.0 | 82.0 |
| Thermal-Conductivity | 0.07 | 0.08 | 0.09 | 0.08 | 0.07 | 0.09 |
| Flexural-Strength | 15.0 | 16.5 | 17.8 | 18.5 | 10.0 | 20.0 |
| Dielectric- | 295 | 230 | 253 | 550 | 325 | 430 |
| Dissipation-Factor | 0.0069 | 0.0243 | 0.0089 | 0.0098 | 0.0155 | 0.0158 |
| Dielectric-Strength | >150 | >150 | >200 | >200 | >200 | >200 |

Note: Units
Thermal Expansion - (x) . $10^{-7}$ in/in/°C
Thermal Conductivity - cal. cm/sec. $cm^{2}$°C
Dielectric Values at frequency of 1KHz at 25°C
Dielectric Strength - volts/mil
Flexural Strength - (X) . $10^3$ p.s.i.

The sintered composites all illustrated characteristics excellent for multilayer ceramic composite formation.

While the above description has been for a homogeneous multilayer ceramic, a number of variations thereon are possible.

One such example is shown in FIG. 1, wherein layers 10, 12 and 14 comprise a low dielectric constant ceramic insulator ceramic material, e.g., as disclosed in U.S. Pat. No. 3,540,894 or in copending U.S. application Ser. No. 449,564 filed Mar. 8, 1974 earlier cited, and layers 11, 13 and 15 comprise a high dielectric constant ceramic in accordance with the present invention.

There also can be a infinite variety of layer arrangements of compatible materials, for example, ferrite films, piezoelectric films, resistive films, semiconductor films, glass films, etc.

This arrangement can also be extended so as to provide vertical inserts within each of the plurality of laythe glasses from the binary system $PbO-SiO_2$, the ternary system $PbO-Al_2O_3-SiO_2$ and the ternary system $PbO-ZrO_2-SiO_2$ and which has a dielectric constant of from about 230 to about 550.

2. The sintered high dielectric constant ceramic body of claim 1 wherein said glass comprises less than about ⅓ of the weight of said refractory material.

3. The sintered high dielectric constant ceramic body of claim 1 wherein said glass comprises from about 20 to about 30 wt. % of said glass plus said refractory material.

4. The sintered high dielectric constant ceramic body of claim 1 wherein said refractory material has a dielectric constant of from about 1100 to about 1500.

5. The sintered high dielectric constant ceramic body of claim 1 wherein said refractory material coprises a titanate or a zirconate.

6. The sintered high dielectric constant ceramic body of claim 1 wherein said refractory material is selected from the group consisting of barium titanate, lead zirconium titanate, lead bismuth niobate-barium titanate, bismuth zirconate, bismuth titanate or a blend thereof.

7. The sintered high dielectric constant ceramic body of claim 1 wherein said lead silicate based glass is selected from the group consisting of tribasic lead silicate, lead monosilicate, lead alumina bisilicate, eutectic lead bisilicate, lead zirconium silicate or a blend thereof.

8. The sintered high dielectric constant ceramic body of claim 1 wherein a single polycrystalline ceramic refractory material is present.

9. The sintered high dielectric constant ceramic body of claim 8 wherein said single polycrystalline ceramic refractory material is barim titanate.

10. The sintered high dielectric constant ceramic body of claim 8 wherein said single polycrystalline ceramic refractory material is lead zirconium titanate.

11. The sintered high dielectric constant ceramic body of claim 8 wherein said single polycrystalline ceramic refractory material is lead bismuth niobate-barium titanate.

12. The sintered high dielectric constant ceramic body of claim 8 wherein said single polycrystalline ceramic refractory material is bismuth zirconate.

13. The sintered high dielectric constant ceramic body of claim 8 wherein said single polycrystalline ceramic refractory material is bismuth titanate.

14. The sintered high dielectric constant ceramic body of claim 1 which consists of said polycrystalline ceramic refractory material and said glass.

15. The sintered high dielectric constant ceramic body of claim 8 which consists of said polycrystalline ceramic refractory material and said glass.

16. The sintered high dielectric constant ceramic body of claim 1 which contains at least 11.79 % by weight lead, expressed as PbO.

* * * * *